United States Patent
Yang et al.

(10) Patent No.: US 7,512,731 B2
(45) Date of Patent: **\*Mar. 31, 2009**

(54) COMPUTER SYSTEM AND MEMORY BRIDGE FOR PROCESSOR SOCKET THEREOF

(75) Inventors: Shan-Kai Yang, Taipei (TW); Wen-Der Kao, Taipei (TW)

(73) Assignee: Mitac International Corp., Hsinchu County (TW)

( * ) Notice: Subject to any disclaimer, the term of this patent is extended or adjusted under 35 U.S.C. 154(b) by 109 days.

This patent is subject to a terminal disclaimer.

(21) Appl. No.: 11/378,387

(22) Filed: Mar. 20, 2006

(65) Prior Publication Data
US 2007/0162678 A1    Jul. 12, 2007

(30) Foreign Application Priority Data
Jan. 6, 2006    (TW) .............................. 95100697 A (51) Int. Cl.
*G06F 13/00* (2006.01)
*G06F 13/36* (2006.01)
*G06F 13/40* (2006.01)
*G06F 13/42* (2006.01)

(52) U.S. Cl. ................ 710/311; 710/104; 710/306; 710/313; 710/315

(58) Field of Classification Search .................. 710/306
See application file for complete search history.

(56) References Cited

U.S. PATENT DOCUMENTS

| | | | | |
|---|---|---|---|---|
| 6,226,741 | B1 * | 5/2001 | Shen et al. ................... | 713/100 |
| 7,007,125 | B2 * | 2/2006 | Barker et al. ................ | 710/301 |
| 7,106,600 | B2 * | 9/2006 | Kupla et al. ................. | 361/783 |
| 7,171,499 | B2 * | 1/2007 | Kelley et al. ................ | 710/104 |
| 2001/0005893 | A1 * | 6/2001 | Shen et al. ................... | 713/300 |
| 2004/0122973 | A1 * | 6/2004 | Keck et al. ................... | 709/238 |
| 2004/0268000 | A1 * | 12/2004 | Barker et al. ................ | 710/301 |
| 2005/0080978 | A1 * | 4/2005 | Kelley et al. ................ | 710/317 |
| 2005/0243531 | A1 * | 11/2005 | Kulpa et al. ................. | 361/783 |
| 2006/0080484 | A1 * | 4/2006 | Lefebvre et al. ............ | 710/104 |

OTHER PUBLICATIONS

HyperTransport Technology Consortium; HyperTranport I/O Link Specification; HyperTransport Technology Consortium; Oct. 10, 2001; Revision 1.03; various pages.*

* cited by examiner

*Primary Examiner*—Paul R. Myers
*Assistant Examiner*—Ryan M Stiglic
(74) *Attorney, Agent, or Firm*—Rabin & Berdo, P.C.

(57) ABSTRACT

A multi-processor computer system includes a memory bridge configured in a processor socket on a motherboard. The memory bridge module electrically connects a processor bus and a memory bus that connect to the processor socket. Thus, an adjacent processor is capable of accessing an unused memory by way of the processor bus, the memory bridge and the memory bus.

31 Claims, 13 Drawing Sheets

COMPUTER SYSTEM AND MEMORY BRIDGE FOR PROCESSOR SOCKET THEREOF

BACKGROUND OF THE INVENTION

1. Field of Invention

The present invention relates to a computer system for data processing, and more particularly, to a computer system having a memory bridge configured in a processor socket to electrically connect a processor bus and a memory bus.

2. Related Art

The most significant component in a computer system is the CPU (Central Processing Unit), which is undoubtedly as important as a heart to a human. To precisely process data that becomes larger and more complex at a higher speed, several CPUs are configured on a mother board and/or an expansive CPU card to build up a multi-processor computer system. However, the mechanism of accessing memory still creates a bottleneck in high performance computing.

Figure 1A:
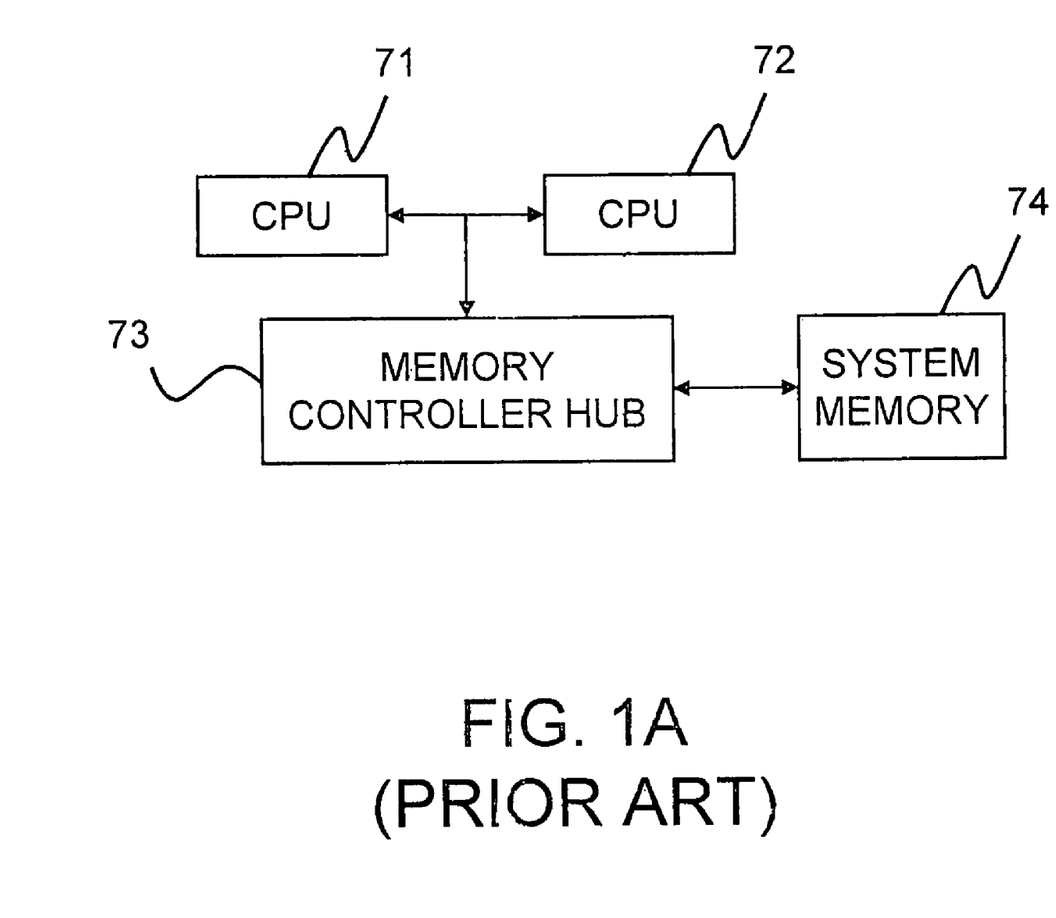
FIG. 1A illustrates a memory-access architecture for a dual-processor computer system in the prior art.

In a conventional system with south/north bridge architecture, memory accessing is controlled by a north bridge chip. As Shown in FIG. 1A, two processors 71 and 72 of a dual-processor system share a system memory 74, wherein the north bridge is utilized as a memory controller hub (MCH) 73. When only one of processor 71 and 72 is operating, almost all the system memory 74 is available. However, the accessing speed will be limited due to the control process of the MCH 73. And such situation becomes more obvious while the processor 71 and 72 are both operating and sharing the bandwidth of a memory bus between the MCH 73 and the system memory 74.

To solve the problem, cache memory is used to save common commands and data for CPU to access. No matter imbedded in the CPU or configured externally, the cache memory avoids the CPU from accessing system memory frequently and from slowing down the whole system. But for the system memory that managed by the MCH or north bridge, this sharing architecture is still a limitation itself.

Figures 1B, 1C:
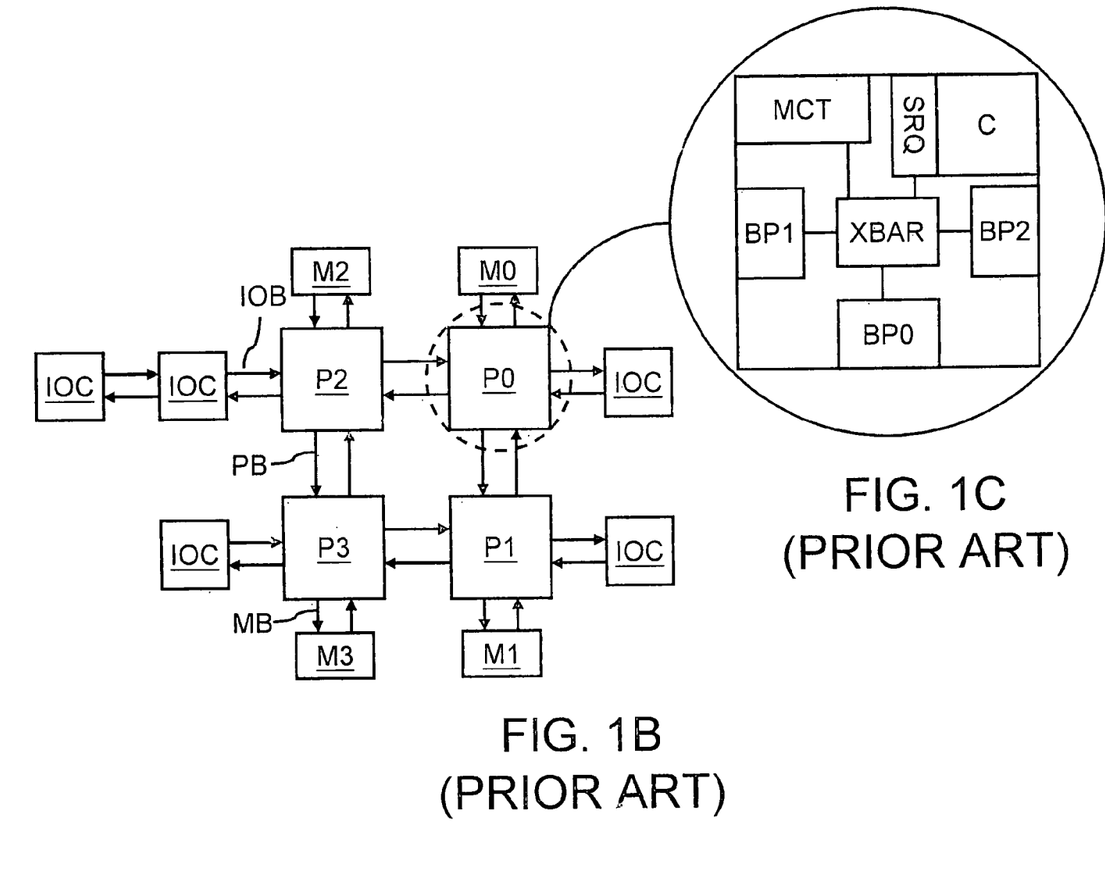
FIGS. 1B and 1C illustrate another memory-access architecture for a four-processor computer system in the prior art.

Please refer to FIGS. 1B and 1C. In the illustrated four-processor system, each of the processor P0, P1, P2 and P3 has dedicated memory M0, M1, M2 and M3 respectively. The processor P0, P1, P2 and P3 connect each other by processor buses PB, and connect to an I/O controller IOC such as a south bridge or a PCI bridge by an I/O bus IOB. In each of the processor P0, P1, P2 and P3, a crossbar switch XBAR is configured to connect a Bus Port BP0, BP1 and BP2, and a memory controller MCT and a system request queue SRQ. The system request queue SRQ manages data processing requests for the processing core C while each memory controller MCT controls the accessing processes of the memory M0, M1, M2 and M3 through each memory bus MB. Under certain conditions, the memory accessing architecture shown in FIG. 1B provides higher accessing speed than the one shown in FIG. 1A, thereby allowing the processor P0, P1, P2 and P3 achieve the best performance. Furthermore, the processor P0, P1, P2 and P3 are capable of sharing memory M0, M1, M2 and M3 by way of processor buses PB and crossbar switch XBAR to reach optimum efficiency of memory utilization.

However, when one CPU fails in this multi-processor system, or one or more CPUs are removed by the user due to special reasons, those memories connected to the failed/removed will become unused. That is truly a waste.

SUMMARY OF THE INVENTION

To solve the problems mentioned above, the present invention discloses a computer system and a memory bridge thereof to enable a processor to communicate with an unused memory, an I/O controller or a subsystem in circuit connection with an unused processor socket, without configuring an additional processor in the unused processor socket or any system architecture changes.

According to an embodiment of the present invention, a computer system includes a mother board that further includes at least one first processor socket, at least one second processor socket, at least one memory, at least one processor bus, at least one memory bus, at least one processor and at least one memory bridge. The processor bus is for electrically connecting the first processor socket and the second processor socket. The memory bus is for electrically connecting the second processor socket and the memory. The processor is configured in the first processor socket for electrically connecting the processor bus through the first processor socket. And the memory bridge is configured in the second processor socket for electrically connecting both the processor bus and the memory bus through the second processor socket. Thus, the processor accesses the memory through the processor bus, the memory bridge and the memory bus.

According to an embodiment of the present invention, a computer system includes a mother board that further includes at least one first processor socket, at least one second processor socket, at least one processor, at least one I/O bus, at least one memory bus, at least one processor and at least one memory bridge. The processor bus is for electrically connecting the first processor socket and the second processor socket. The I/O bus is for electrically connecting the second processor socket. The memory bus is for electrically connecting the second processor socket. The processor is configured in the first processor socket for electrically connecting the processor bus through the first processor socket. And the memory bridge is configured in the second processor socket for electrically connecting the processor bus, the I/O bus and the memory bus through the second processor socket. Thus, the processor electrically connects to the I/O bus and the memory bus through the processor bus and the memory bridge.

According to an embodiment of the present invention, a memory bridge is provided for replacing a second processor to configure in a second processor socket on a mother board. The second processor socket electrically connects a processor bus and a memory bus. The memory bridge includes a plurality of first and second electrical contacts, a memory controller and a control unit. The first electrical contacts are for configuring into the second processor socket to electrically connect the processor bus. The second electrical contacts are for configuring in the second processor socket to electrically connect the memory bus. The memory controller is in circuit connection with the second electrical contacts. And the control unit is in circuit connection with the first electrical contacts and the memory controller to control signal/data transmission between the first electrical contacts and the memory controller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 2:
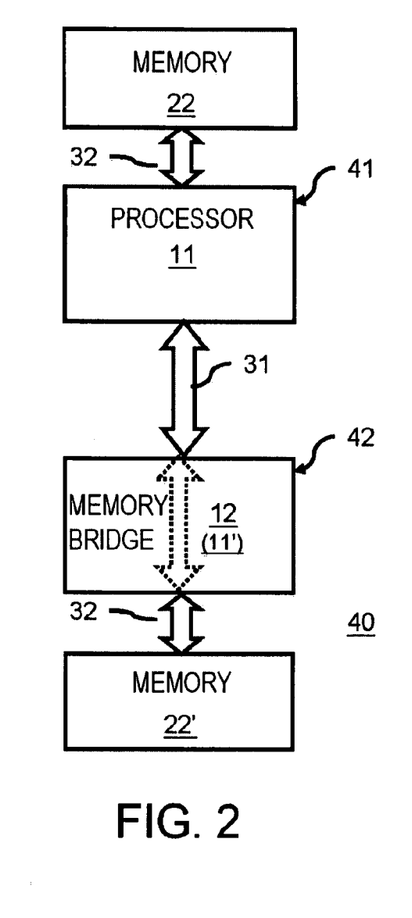
FIG. 2 is a block diagram illustrating a dual-processor computer system according to the present invention.

Please refer to FIG. 2, which shows a dual-processor computer system and a memory bridge thereof according to an embodiment of the present invention. A mother board 40 configures thereon a processor bus 31, two memory buses 32, a processor 11, a memory bridge 12, a first processor socket 41, a second processor socket 42 and two memory 22 and 22'. The processor 11 inserts in the first processor socket 41 while the memory bridge 12 replaces a processor 11' to insert in the second processor socket 42 to achieve indirectly electrical connection with the processor bus 31 and the memory bus 32. Thus, the processor bus 31 and the memory bus 32 are linked together.

The processor 11 and 11' disclosed in the present embodiment are central processing units (CPUs) while the memory 22 and 22' are system memories for the processor 11 and 11' respectively. The processor bus 31 is substantially of dual uni-directional point-to-point bus, such as a bus compatible with HyperTransport standard, capable of applying to the communication between a processor and a chipset, an I/O controller or a "subsystem" (generally the second mother board with expansion buses or other expansion functions).

The processor bus 31 is configured between the first processor socket 41 and the second processor socket 42 to electrically connect the processor 11 and the memory bridge 12. The memory bus 32 located between the second processor socket 42 and the memory 22' is for connecting the memory bridge 12 and the memory 22'. Therefore, the processor 11 is capable of accessing the memory 22' through the processor bus 31, the memory bridge 12 and the memory bus 32, without configuring the second processor 11' in the second processor socket 42.

The memory bridge 12 may be a circuit board module. To be configured in the second processor socket 42, the memory bridge 12 has the same package structure as the processor 11 or 11'. The first processor socket 41 and the second processor socket 42 will have the same specification if the mother board 40 remains the same architecture for the memory bridge 12. If the specification of the second processor socket 42 is changed, the memory bridge 12 will no longer need to have the same specification as the processor 11', but need to be compatible with the second processor socket 42 and its pins that have certain definitions.

Figure 3A:
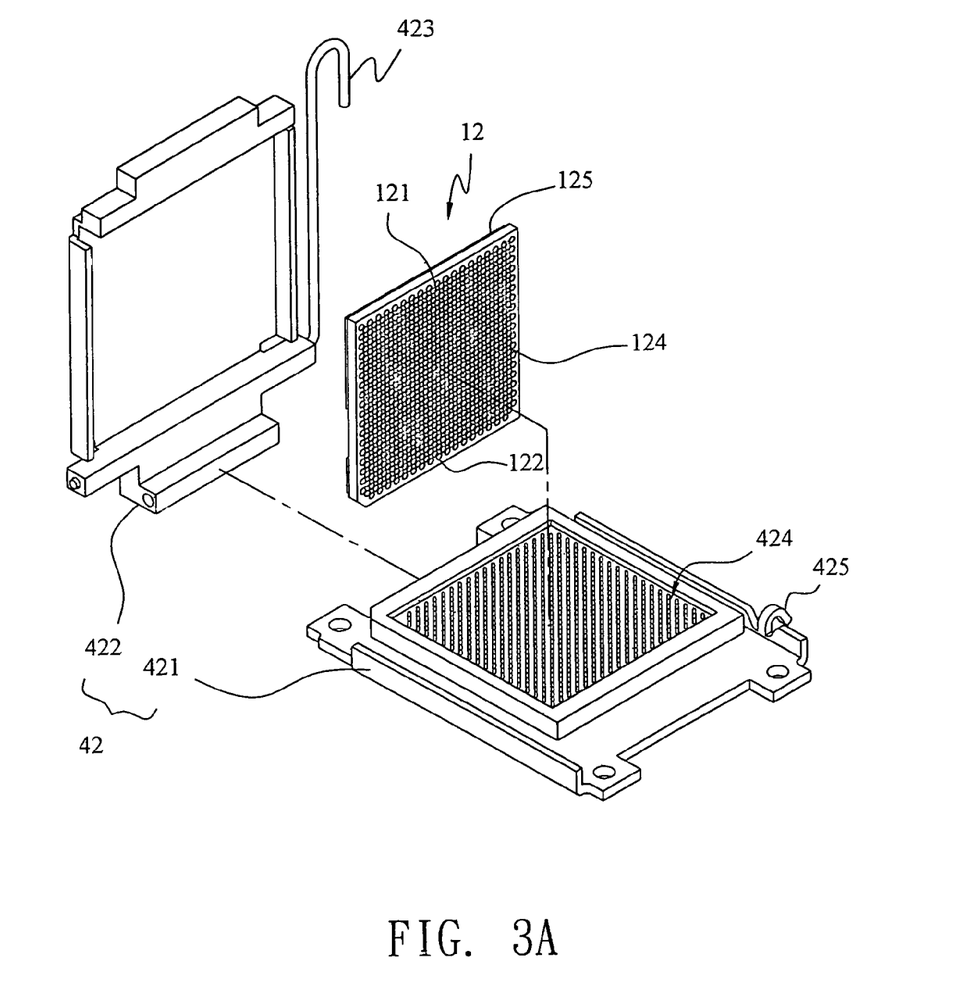
FIG. 3A is a decomposition diagram illustrating that a memory bridge and a processor socket according to the present invention.
Figure 3B:
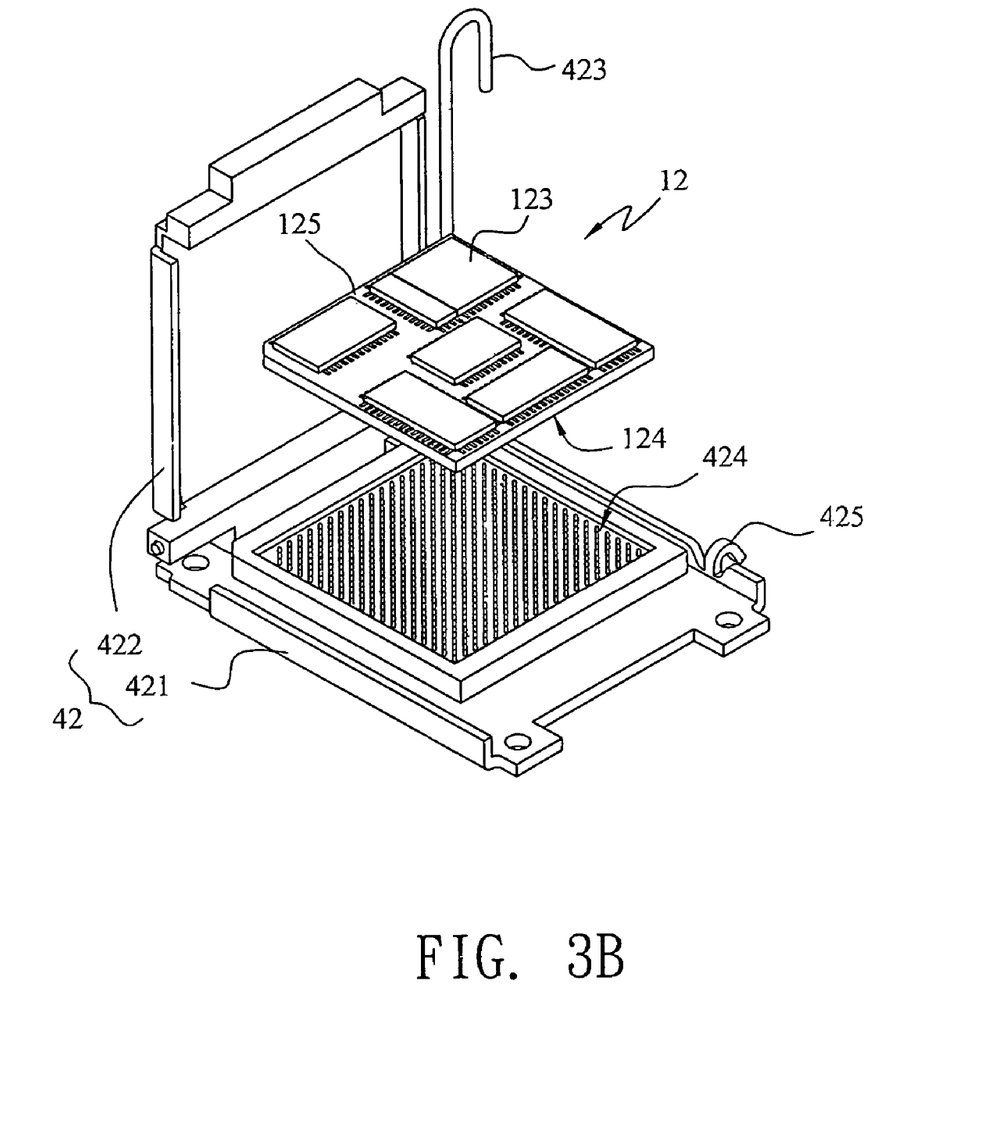
FIG. 3B is an explanatory diagram illustrating that a memory bridge is inserted in a processor socket according to the present invention.
Figure 4:
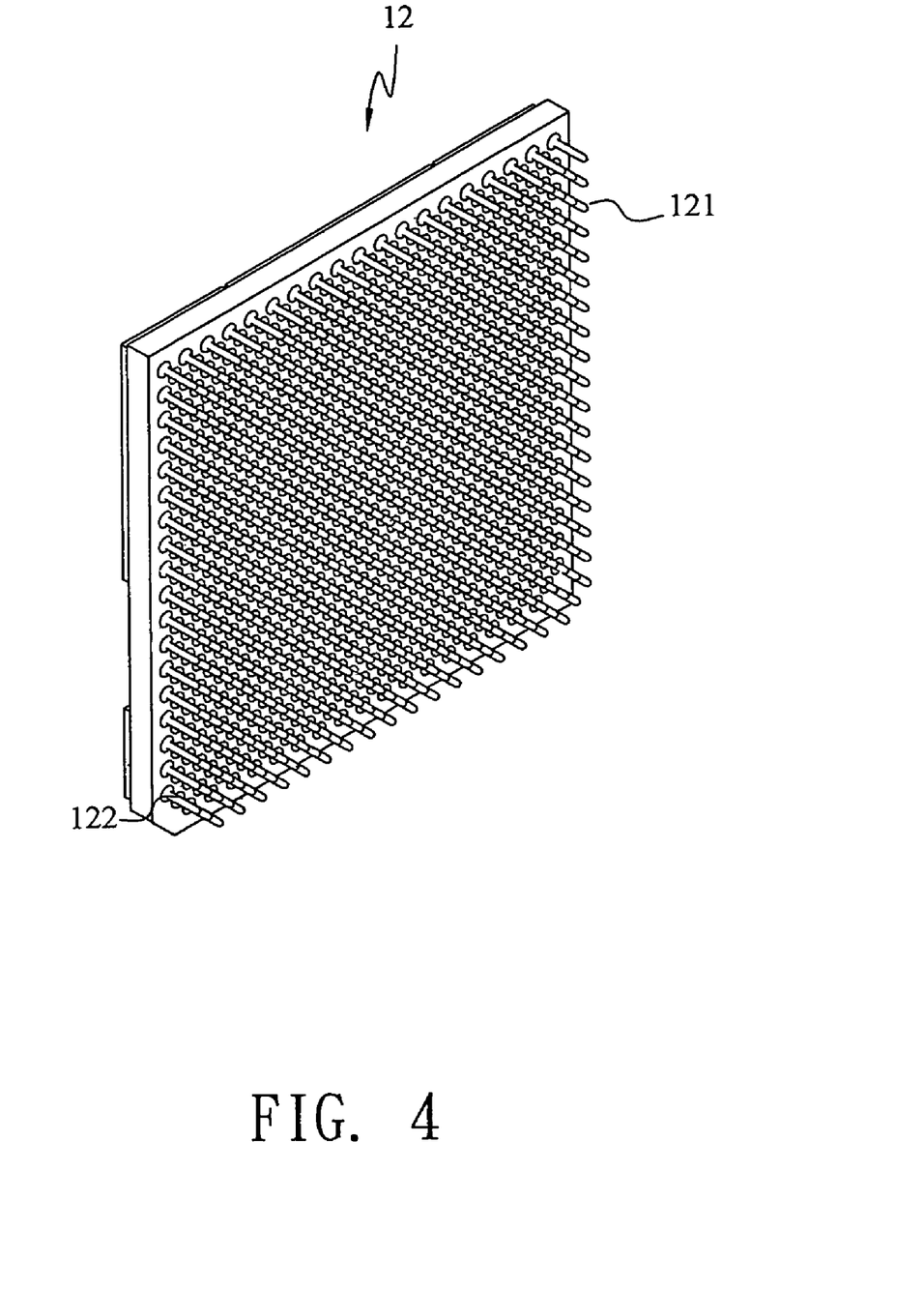
FIG. 4 illustrates another practical form of a memory bridge according to the present invention.

Please refer to FIGS. 3A and 3B. The memory bridge 12 is a circuit board module with processor-package structure to be configured in a pedestal 421 of the second processor socket 42. The pedestal 421 is fastened on the mother board 40. When the memory bridge 12 is inserted in the pedestal 421, a cover 422 is closed to the pedestal 421, with a lever 423 of the cover 422 engaged with a hook 425 of the pedestal 421. The memory bridge 12 has a first surface 124 that configures a plurality of first electrical contacts 121 and second electrical contacts 122 for configuring into the first and second processor sockets 41 and 42 respectively. The first electrical contacts 121 serve as a bus port to connect a processor bus or an I/O bus while the second electrical contacts 122 serve as a memory port to connect a memory bus. When the memory bridge 12 is inserted in the pedestal 421, the first electrical contacts 121 and the second electrical contacts 122 connect a plurality of responsive flexible members 424 on the pedestal 421 respectively. Each of the flexible members 424 is for electrically connecting to the traces (not shown) of the processor bus 31 and the memory bus 32 (referring to FIG. 2) on the mother board 40 respectively. Each of the first electrical contacts 121 is responding to one of the second electrical contact 122 (having the same definition), using electrical components 123 (integrated circuits shown in FIG. 3B) located on a second surface 125 and essential circuits to connect each other, thereby linking the processor bus 31 and the memory bus 32. The first and second electrical contacts 121 and 122 and the connected electrical component 123 should have unlimited relative positions. For those skilled in the art, the practical forms of the memory bridge 12 may be integrated circuits with semiconductor processing package for a processor. Providing that the second processor socket 42 is unchanged, the first electrical contacts 121 and the second electrical contacts 122 are metal pads with the same pitches and diameters as the processor 11'. The second processor socket 42 illustrated in FIGS. 3A and 3B is of a LGA (Land Grid Array) package type, which is only for explanation and should not be a limitation for the application field of the memory bridge 12. In FIG. 4, if the replaced processor 11' has a package type of PGA (Pin Grid Array), then the memory bridge 12 will need a plurality of metal pins for serving as electrical contacts. Correspondingly, the pedestal 421 of the second processor socket 12 will need insert holes for receiving the pins and furthermore, other electrical contacts located in the insert holes to electrically connect the inserted pins. Except the first and second electrical contacts 121 and 122, other electrical contacts configured on the processor 11' are optional for the memory bridge 12.

As to the definition of each of the first electrical contacts 121, since aforesaid processor bus 31 is a dual uni-directional point-to-point bus, such as a HyperTransport-compatible bus, the first electrical contacts and the electrical contacts of the second processor socket 42 must follow the same specification as well. Generally, when a processor configured in a processor socket, it could possibly support more than two dual uni-directional point-to-point buses. For example, an AMD Opteron™ MP processor supports three HyperTransport buses each holds the equal position for BIOS (Basic Input/Output System). That means no master/slave differences for the three buses when processing data. So the positions of these 3 buses are equal to each other and not restricted to certain linking processors, buses or controllers. However, if a memory bridge is configured, the processor bus 31 needs to meet the same requirements to provide a transmission channel between the memory bridge 12 and the processor 11 configured in the first processor socket 41, as shown in FIG. 2. According to the embodiment of the present invention, the memory bus 32 has to fit the type of system memory and data transmission specifications. Same requirements are also necessary to the second electrical contacts 122 that serve as the memory port.

Figure 5:
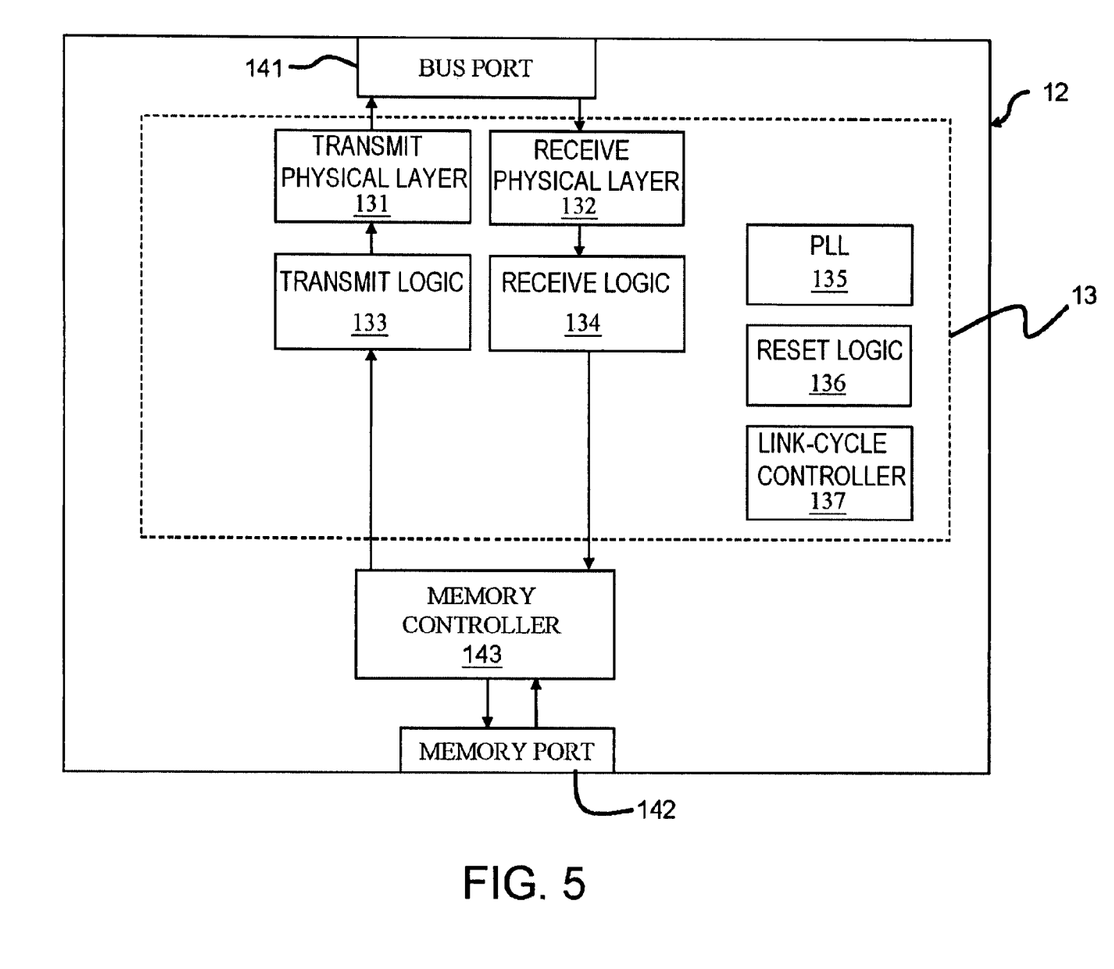
FIG. 5 is an explanatory block diagram of the memory bridge according to the present invention.

Please refer to FIG. 5, which is to further disclose the electrical components 123 and essential circuits (shown in FIG. 3A) configured on the memory bridge 12. The memory bridge 12 includes a control unit 13, a bus port 141, a memory port 142 and a memory controller 143. In practice the bus port 141 serves as the first electrical contacts 121 in FIGS. 3A and 3B while the memory port 142 are provide by the second electrical contacts 122 in FIGS. 3A and 3B. The control unit 13 includes a transmit physical layer 131, a receive physical layer 132, a transmit logic 133, a receive logic 134, a phase locked loop 135, a reset logic 136 and a link-cycle controller 137, which are of integrated circuits or chips.

The transmit physical layer 131, the receive physical layer 132, the transmit logic 133 and the receive logic 134 enable the control unit 13 to connect via the bus port 141 to the processor bus 31. And similarly, the memory controller 143 connects the memory 22' through the memory port 142 and the memory bus 32 for access management.

The receive physical layer 132 is in circuit connection with the receive logic 134 and the bus port 141 (the first electrical contacts) to receive signal/data from the processor bus 31 and transmit to the receive logic 134 for processing. The transmit physical layer 131 is in circuit connection with the transmit logic 133 and the bus port 141. Signal/data from the memory controller 143 will be first processed by the transmit logic 133 and then be transmitted through the transmit physical layer 131, the bus port 141 to the processor bus 31.

The memory controller 143 is in circuit connection with the transmit logic 133, the receive logic 134 and the memory port 142 (the second electrical contacts 122). When the processor 11 needs to access the memory 22', the memory controller 143 processes all the related management tasks through the processor bus 31, the receive physical layer 132, the transmit physical layer 131, the receive logic 134 and the transmit logic 133.

The phase locked loop 135 is to generate the core clock for the transmit physical layer 131, the receive physical layer 132, the transmit logic 133 and the receive logic 134 to limit all the electrical components of the entire memory bridge 12 to a specific operating frequency range. The reset logic 136 is to process the reset and initialization tasks for the memory bridge 12, including resetting the state machine to an initial state. The link-cycle controller 137 is to manage link communication of the transmit physical layer 131, the receive physical layer 132, the transmit logic 133, the receive logic 134 and the memory controller 143.

As to those systems that apply HyperTransport technology, said transmit physical layer 131, the receive physical layer 132, the transmit logic 133 and the receive logic 134 should follow the data receive/transmit protocol for HyperTransport.

Figure 6:
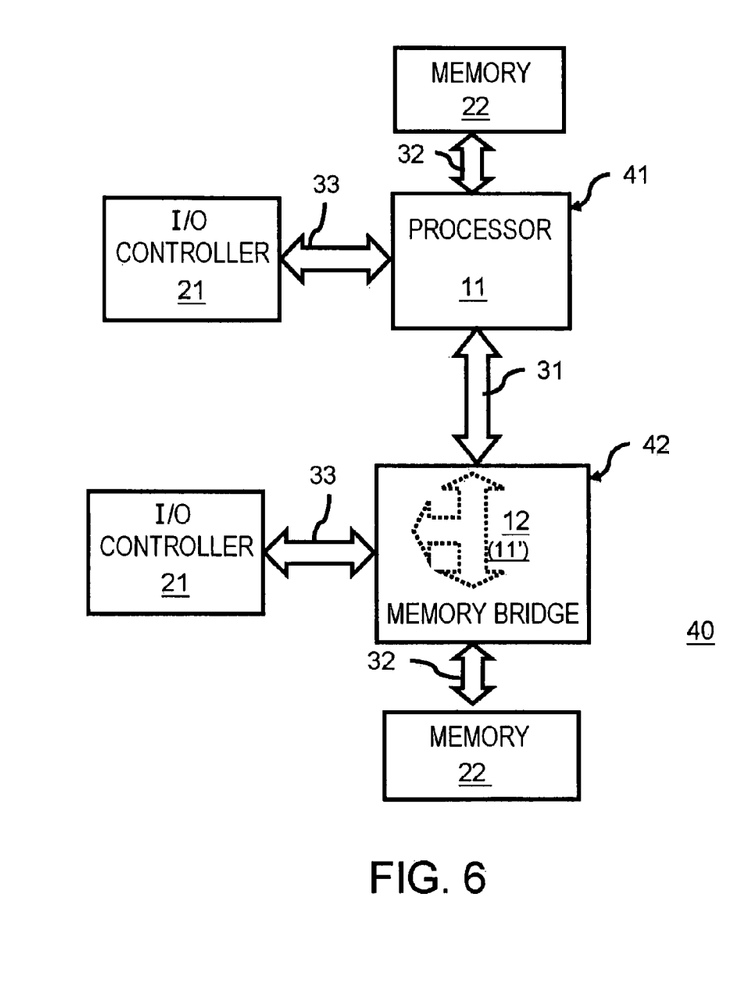
FIG. 6 is another block diagram of dual-processor with a memory bridge according to the present invention.

Please refer to FIG. 6. In another practical embodiment for a dual-processor system according to the present invention, a mother board 40 has a processor bus 31, two I/O (input/output) buses 33 and 33', two memory buses 32 and 32', a processor 11, a memory bridge 12, a first processor socket 41, a second processor socket 42, two I/O controllers 21 and 21' and two memories 22 and 22'. The processor 11 is configured in the first processor socket 41 while the memory bridge 12 replaces another processor 11' to be configured in the second processor socket 42, thereby electrically connecting with the processor bus 31, the I/O bus 33' and the memory bus 32' to transmit signal/data. In practice the processor 11 and 11' are CPUs while the I/O controller 21 may be north bridge, south bridge, a I/O bridge, or a single bridge chip integrating south and north bridges.

The processor bus 31 and the I/O bus 33/33' are substantially dual uni-directional point-to-point buses that have the same data transmission protocol, such as HyperTransport-compatible buses for applying to data and signal transmission between processors, or between a processors and a chipset, an I/O controller or a subsystem. Therefore, the processor 11 is enabled to connect to the memory bridge 12 through the processor bus 31, thereby utilizing the I/O controller 21' via the I/O bus 33', or accessing the memory 22' through the memory bus 32'.

Figure 7:
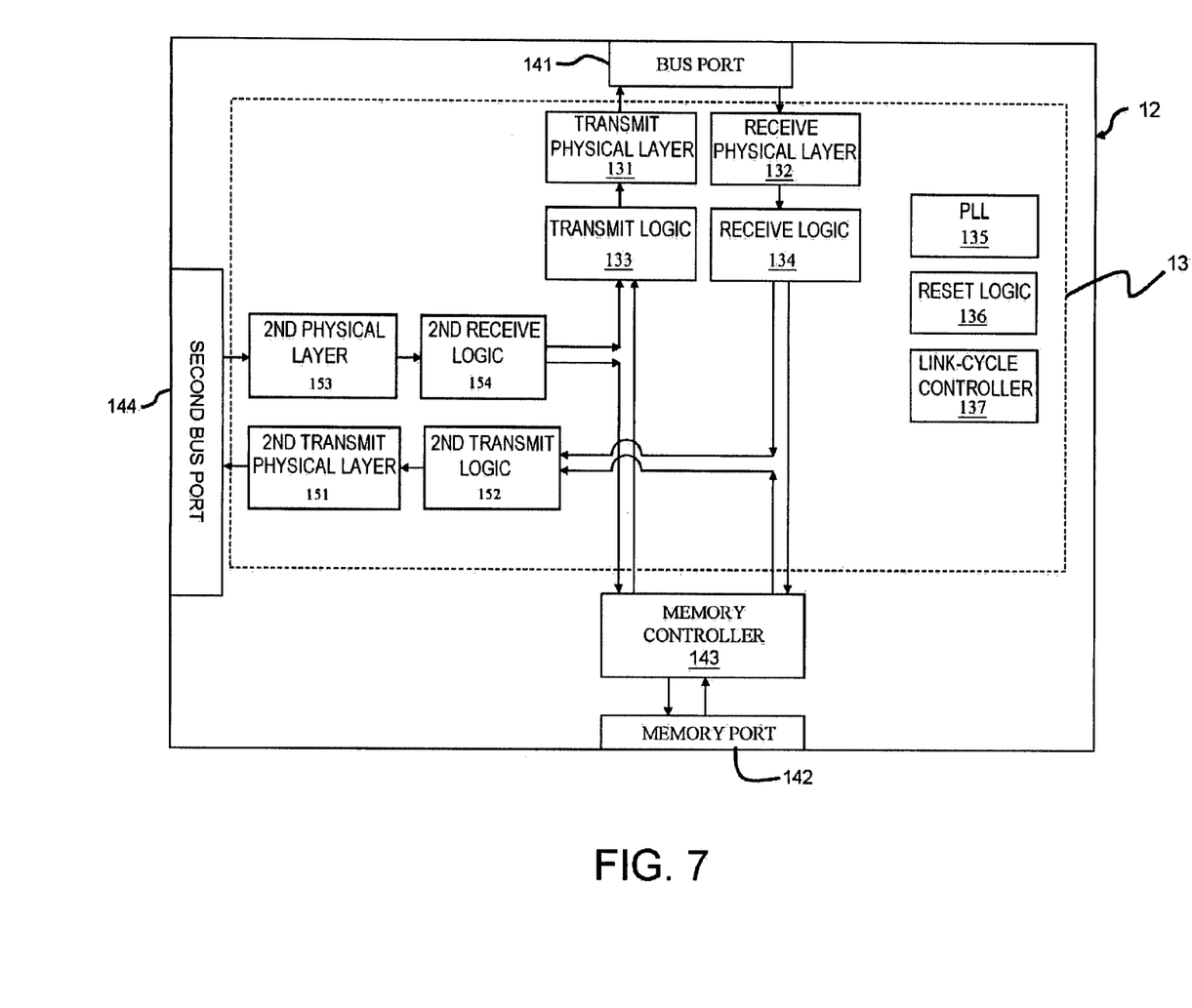
FIG. 7 is an explanatory block diagram for the memory bridge shown in FIG. 6.

As shown in FIG. 7, to realize the architecture mentioned above, except all the components shown in FIG. 5 (including the bus port 141, the transmit physical layer 131, the receive physical layer 132, the transmit logic 133, the receive logic 134, the phase locked loop 135, the reset logic 136 and the link-cycle controller 137), the memory bridge 12 needs additionally a second bus port 144 and another set of a second transmit physical layer 151, a second receive physical layer 153, a second transmit logic 152 and a second receive logic 154 with the link-cycle controller 137 serving as a switch controller.

The second bus port 144 may be practical by a set of third electrical contacts (not shown). The second bus port 144 (the third electrical contacts) has the same definitions as the first electrical contacts, such as HyperTransport standard, to connect the I/O bus 33'.

the second receive physical layer 153 is in circuit connection with the second receive logic 154 and the second bus port 144 to receive signal/data from the I/O bus 33' and transmit to the second receive logic 154 for processing. The second receive logic 154 is in circuit connection with the transmit logic 133 and the memory controller 143 to transmit signal/data. The second transmit physical layer 151 is in circuit connection with the second transmit logic 152 and the second bus port 144 while the second transmit logic 152 is in circuit connection with the receive logic 134 and the memory controller 143. After being processed by the second transmit logic 152, signal/data from the memory controller 143 or the receive logic 134 will be transmitted through the second transmit physical layer 151, the second bus port 144 to the I/O bus 33'.

The present invention provides a memory bridge to achieve bridge connection of processor to processor, processor to unused memory, and processor to I/O controller. Furthermore, the memory is applicable to multi-processor system such as 2-way, 4-way and 8-way systems or even cluster computers.

Figure 8A:
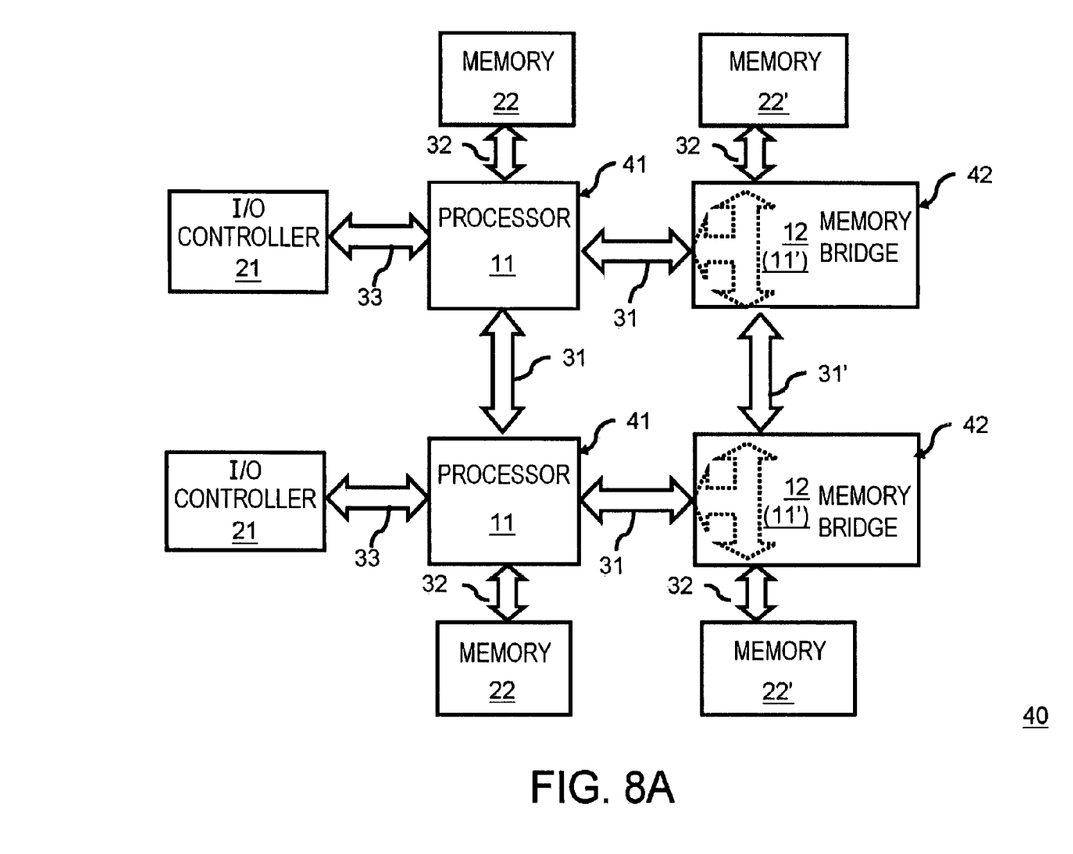
FIG. 8A is a block diagram illustrating a 4-processor computer system with two memory bridges according to the present invention.

Please refer to FIG. 8A, which illustrates a embodiment of a four-processor computer system with two processors 11' replaced by memory bridges 12. In the present embodiment, the memory bridge 12 is similar to the one in FIG. 7. Two processors 11 are capable of accessing two memories 22' through the processor bus 31, the memory bridge 12 and the memory bus 32. Since the memory bridge 12 provides link to the processor bus 31', the processor bus 31' can operate normally. The processor 11 in the left-up corner can also access the memory 22' in the right-bottom corner. However, if a memory bridge as shown in FIG. 5 is applied, the processor bus 31' will not be able to operate.

Figure 8B:
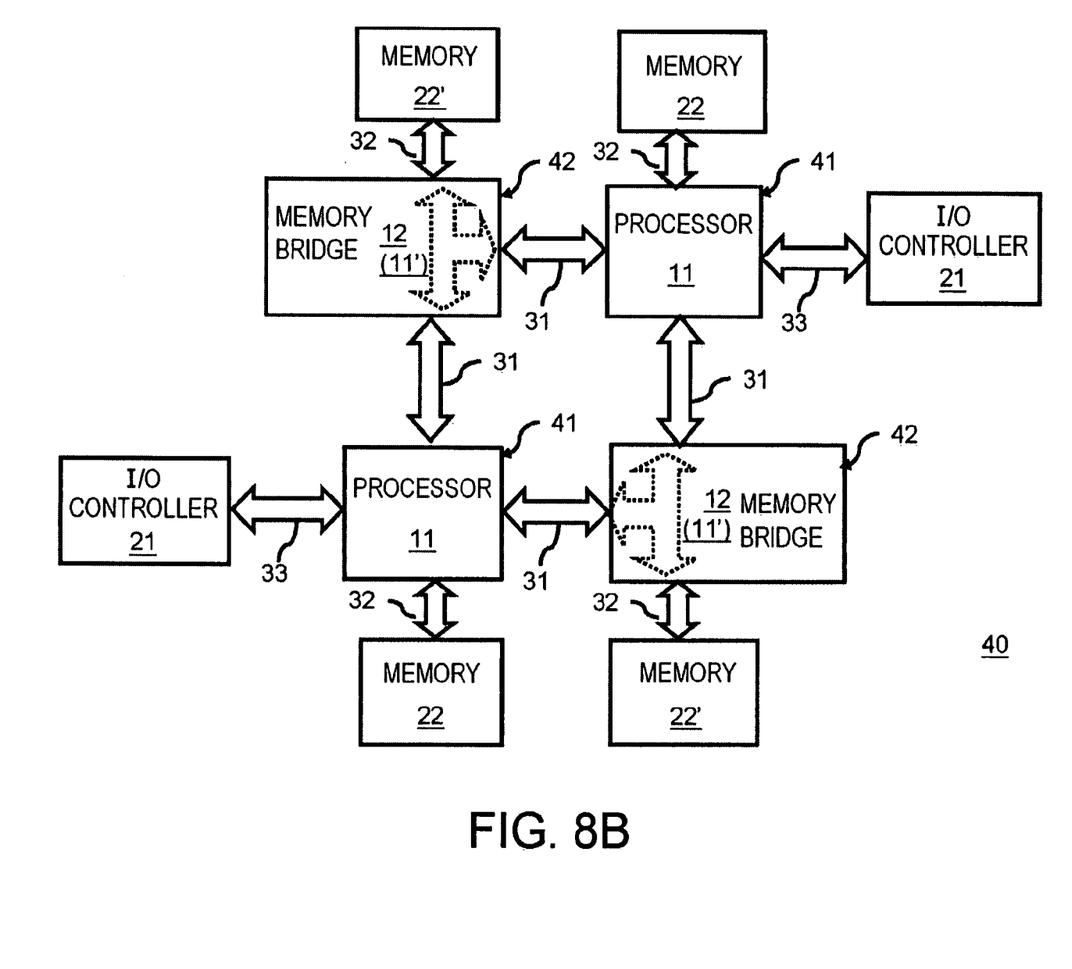
FIG. 8B is a block diagram illustrating another 4-processor computer system with two memory bridges according to the present invention.

Please refer to FIG. 8B. A four-processor computer system have two memory bridges 12 configured in two second processor sockets 42 to connect two pairs of processor bus 31 and memory bus 32, thereby enabling the two processors 11 configured in the two first processor sockets 41 to communicate with each other. Now we define Transmission Latency between processors as: the number of buses needed to achieve communications between any two processors. Then the replacement of the memory bridge 12 in the present embodiment causes no additional Transmission Latency, which means Latency maintain 2 without any increase. Each of the two processors 11 can access the two unused memories 22' connected by the two memory bridges 12.

Figure 9:
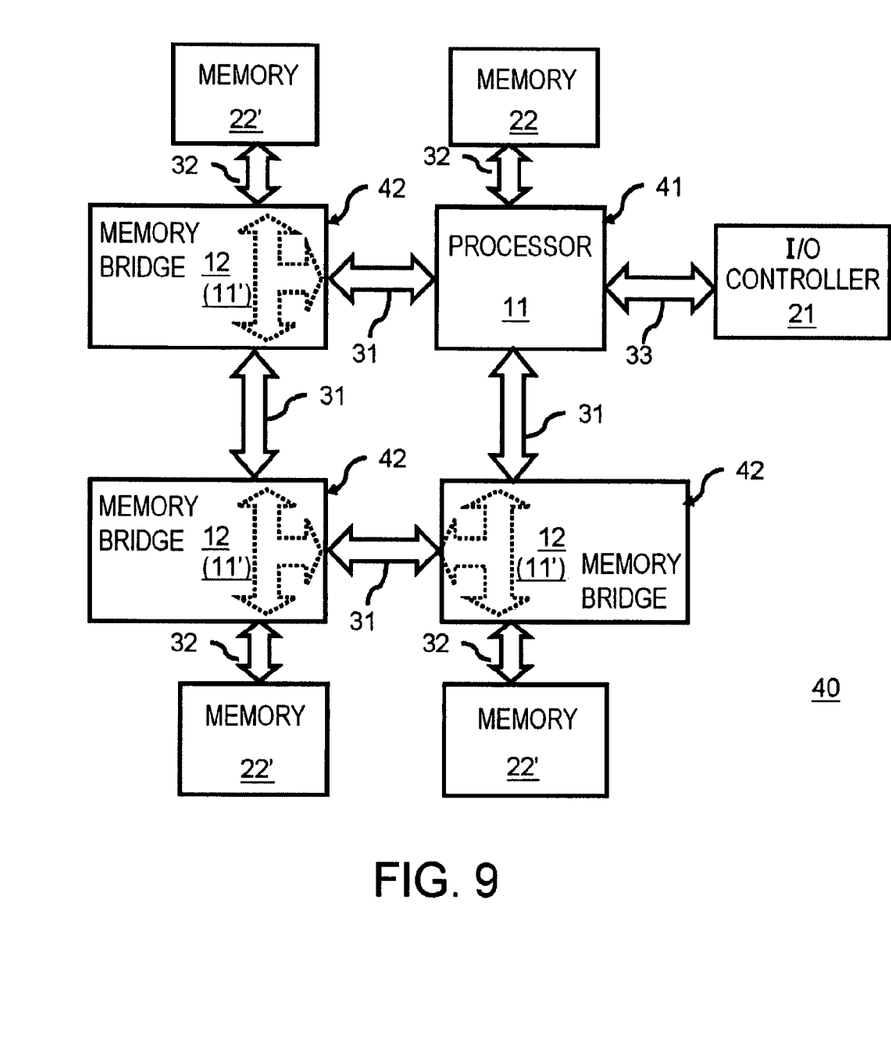
FIG. 9 is a block diagram illustrating another 4-processor computer system with three memory bridges according to the present invention.

Please refer to FIG. 9. Three memory bridges 12 replaces processors 11' to configure in the second processor sockets 42 to enable the processors 11 to access one dedicated memory 22 and three unused memories 22'.

Figure 10:
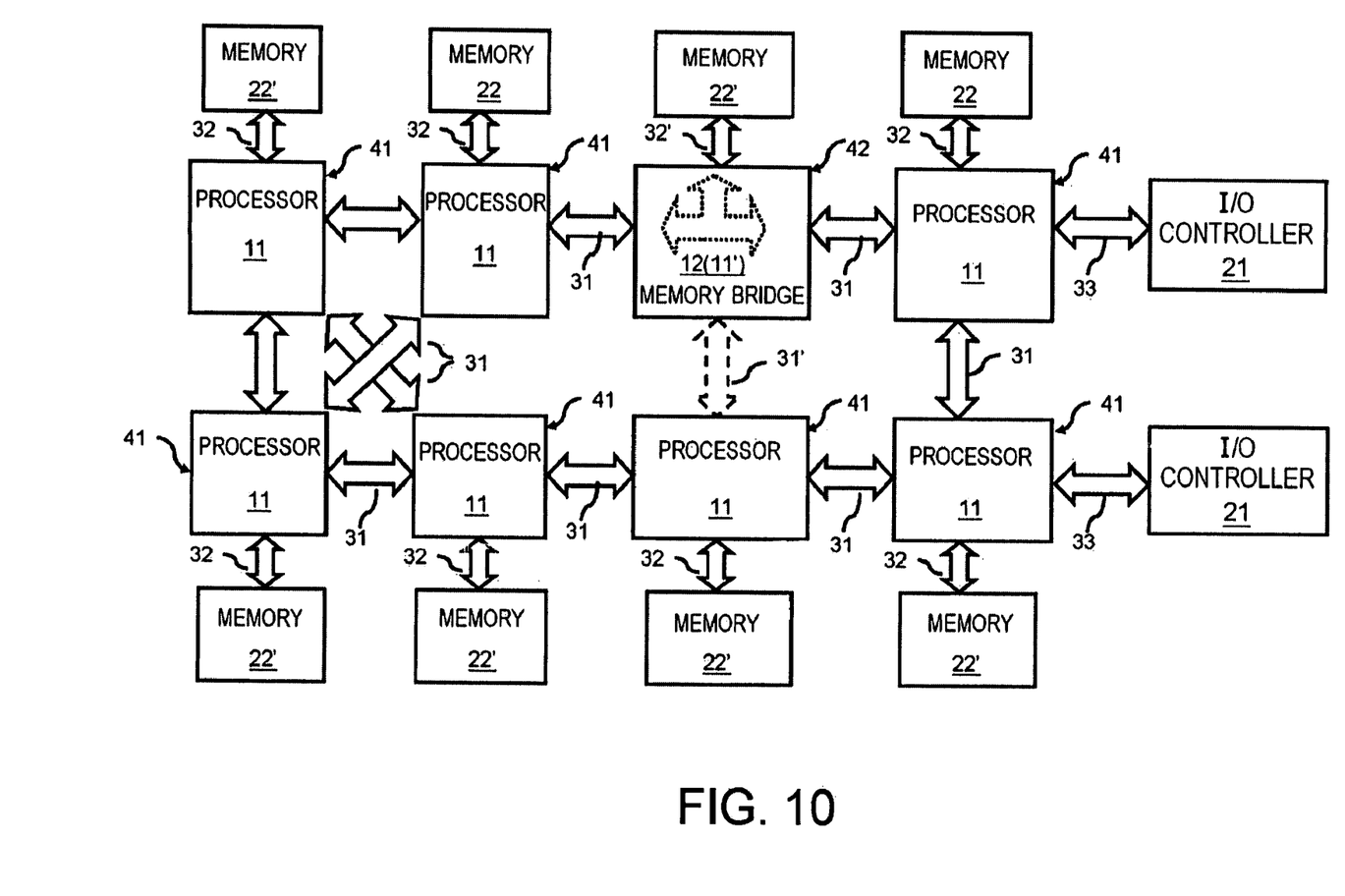
FIG. 10 is a block diagram illustrating an 8-processor computer system with a memory bridge according to the present invention.

Please refer to FIG. 10. In a 8-processor computer system according to the present embodiment, each processor 11 supports three HyperTransport bus (processor bus 31 and I/O bus 33) and one memory bus 32 for the memory 22, while the memory bridge 12 can support only two HyperTransport bus and one memory bus 32' for the memory 22'. The processor bus 31' will not be functional when the memory bridge 12 is configured. For the two processors 11 in a diagonal corner, the transmission latency will remain as 3 without any increase. Similarly, multi-processor computer systems that have more than 8 processors can be operating in the same way with the technical features of the present invention.

The memory disclosed in the present invention is system memory dedicated to CPUs. In practice the memory may include one or more memory module with RAM (Random Access Memory) units such as SDRAM.

As to detecting and determining whether a processor or a memory bridge is configured in a processor socket, one or more GPIO (General Purpose Input/Output) pin of an I/O controller will be available for current computer systems to change the voltage level, which can be detected by BIOS to make related modifications. However, that is not the major feature of the present invention and further description herein is necessary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer system comprising a mother board, the mother board comprising:

at least one first processor socket and at least one second processor socket, each mounted on the mother board;

at least one memory;

at least one processor bus, electrically connecting the first processor socket and the second processor socket;

at least one memory bus, electrically connecting the second processor socket and the memory;

at least one processor configured in the first processor socket, electrically connected to the processor bus through the first processor socket; and at least one memory bridge configured in the second processor socket, electrically connected to both the processor bus and the memory bus through the second processor socket, the memory bridge comprising:

a plurality of first electrical contacts for configuring into the second processor socket to electrically connect the processor bus;

a plurality of second electrical contacts for configuring into the second processor socket to electrically connect the memory bus;

a memory controller in circuit connection with the second electrical contacts; and a control unit in circuit connection with the first electrical contacts and the memory controller, thereby controlling signal/data transmission between the first electrical contacts and the memory controller, the control unit further comprising:

a phase locked loop, configured to generate a core clock to limit all electrical components of the memory bridge to a specific operating frequency range; and a reset logic to reset and initialize the memory bridge;

wherein the processor accesses the memory through the processor bus, the memory bridge and the memory bus.

2. The computer system of claim 1, wherein the memory bridge is a circuit board module with processor-package structure.

3. The computer system of claim 1, wherein the first electrical contacts have definitions compatible with HyperTransport specification.

4. The computer system of claim 1, wherein the control unit further comprising:

a receive physical layer in circuit connection with the first electrical contacts to receive signal/data from the processor bus;

a transmit physical layer in circuit connection with the first electrical contacts to transmit signal/data to the processor bus;

a receive logic in circuit connection with the receive physical layer and the memory controller to process signal/data received from the receive physical layer and transmit to the memory controller; and a transmit logic in circuit connection with the transmit physical layer and the memory controller to process signal/data from the memory controller and transmit to the transmit physical layer.

5. The computer system of claim 4, wherein the control unit further comprising:

a link-cycle controller for controlling link communication of the receive physical layer, the transmit physical layer, the receive logic, the transmit logic and the memory controller.

6. The computer system of claim 1, wherein the processor bus is a dual uni-directional point-to-point bus.

7. The computer system of claim 1, wherein the processor bus is compatible with HyperTransport specification.

8. The computer system of claim 1, wherein the first processor socket and the second processor socket have the same specification.

9. The computer system of claim 1, wherein the memory bridge has a package type of PGA (Pin Grid Array) or LGA (Land Grid Array).

10. A memory bridge for replacing a second processor to configure in a second processor socket on a mother board,
wherein the second processor socket is mounted on the mother board together with a first processor socket electrically connected to a processor bus and the second processor socket is electrically connected to the processor bus and a memory bus, the memory bridge comprising:
a plurality of first electrical contacts for configuring into the second processor socket to electrically connect the processor bus;
a plurality of second electrical contacts for configuring into the second processor socket to electrically connect the memory bus;
a memory controller in circuit connection with the second electrical contacts; and
a control unit in circuit connection with the first electrical contacts and the memory controller to control signal/data transmission between the first electrical contacts and the memory controller, the control unit further comprising:
a phase locked loop, configured to generate a core clock to limit all electrical components of the memory bridge to a specific operating frequency range; and
a reset logic to reset and initialize the memory bridge.

11. The memory bridge of claim 10, wherein the control unit comprising:
a transmit physical layer in circuit connection with the first electrical contacts to transmit signal/data to the processor bus;
a receive logic in circuit connection with the receive physical layer and the memory controller to process signal/data from the receive physical layer and transmit to the memory controller; and
a transmit logic in circuit connection with the transmit physical layer and the memory controller to process signal/data from the memory controller and transmit to the transmit physical layer.

12. The memory bridge of claim 11, wherein the control unit further comprising:
a link-cycle controller for controlling link communication of the receive physical layer, the transmit physical layer, the receive logic, the transmit logic and the memory controller.

13. The memory bridge of claim 11, wherein the memory bridge further comprising:
a plurality of third electrical contacts for configuring into the second processor socket to electrically connect an I/O (input/output) bus;
wherein the control unit further comprising:
a second receive physical layer in circuit connection with the third electrical contacts to receive signal/data from the I/O bus;
a second transmit physical layer in circuit connection with the third electrical contacts to transmit signal/data to the I/O bus;
a second receive logic in circuit connection with the second receive physical layer, the transmit logic and the memory controller to process signal/data received from the second receive physical layer and transmit to the transmit logic or the memory controller; and
a second transmit logic in circuit connection with the second transmit physical layer, the receive logic and the memory controller to process signal/data from the receive logic or the memory controller and transmit to the second transmit physical layer.

14. The memory bridge of claim 11, wherein the first electrical contacts have definitions compatible with Hyper-Transport specification.

15. The memory bridge of claim 11, wherein the processor bus is a dual uni-directional point-to-point bus.

16. The memory bridge of claim 11, wherein the processor bus is compatible with HyperTransport specification.

17. The memory bridge of claim 11, wherein the memory bus electrically connects to a memory.

18. The memory bridge of claim 11, wherein the processor bus electrically connects to a first processor socket, the first processor socket having a processor configured therein.

19. The memory bridge of claim 11, wherein both of the first electrical contacts and the second electrical contacts have a package type of PGA or LGA.

20. The memory bridge of claim 11, wherein both of the first electrical contacts and the second electrical contacts are metal pins or metal pads.

21. A computer system comprising a mother board, the mother board comprising:
at least one first processor socket and at least one second processor socket, each mounted on the mother board;
at least one processor bus electrically connecting the first processor socket and the second processor socket;
at least one I/O bus electrically connecting the second processor socket;
at least one memory bus electrically connecting the second processor socket;
at least one processor configured in the first processor socket, electrically connected to the processor bus through the first processor socket; and
at least one memory bridge configured in the second processor socket, electrically connected to the processor bus, the I/O bus and the memory bus through the second processor socket;
the memory bridge further comprising a control unit to control signal/data transmission between the processor bus, the I/O bus and the memory bus, the control unit further comprising:
a phase locked loop, configured to generate a core clock to limit all electrical components of the memory bridge to a specific operating frequency range; and
reset logic to reset and initialize the memory bridge;
wherein the processor electrically connects to the I/O bus and the memory bus through the processor bus and the memory bridge.

22. The computer system of claim 21, wherein the memory bridge is a circuit board module with processor-package structure.

23. The computer system of claim 21, wherein the processor bus and the I/O bus have the same transmission protocol without master/slave differences when processing signal/data.

24. The computer system of claim 21, wherein the processor. bus and the I/O bus are compatible with Hyper-Transport specification.

25. The computer system of claim 21, wherein the first processor socket and the second processor socket have the same specification.

26. The computer system of claim 21, wherein the memory bridge has a package type of PGA or LGA.

27. The computer system of claim 21, wherein the control unit comprising:
- a receive physical layer in circuit connection with the first electrical contacts to received signal/data from the processor bus;
- a transmit physical layer in circuit connection with the first electrical contacts to transmit signal/data to the processor bus;
- a receive logic in circuit connection with the receive physical layer and the memory controller to process signal/data received from the receive physical layer and transmit to the memory controller; and
- a transmit logic in circuit connection with the transmit physical layer and the memory controller to process signal/data from the memory controller and transmit to the transmit physical layer.

28. The computer system of claim 27, wherein the control unit comprising:
- a link-cycle controller for controlling link communication of the receive physical layer, the transmit physical layer, the receive logic, the transmit logic and the memory controller.

29. The computer system of claim 27, wherein the memory bridge comprising:
- a plurality of third electrical contacts for configuring into the second processor socket to electrically connect the I/O bus;

wherein the control unit further comprising:
- a second receive physical layer in circuit connection with the third electrical contacts to receive signal/data from the I/O bus;
- a second transmit physical layer in circuit connection with the third electrical contacts to transmit signal/data to the I/O bus;
- a second receive logic in circuit connection with the second receive physical layer, the transmit logic and the memory controller to process signal/data received from the second receive physical layer and transmit to the transmit logic or the memory controller; and
- a second transmit logic in circuit connection with the second transmit physical layer, the receive logic and the memory controller to process signal/data from the receive logic or the memory controller and transmit to the second transmit physical layer.

30. The computer system of claim 27, wherein the first electrical contacts have definitions compatible with HyperTransport specification.

31. The computer system of claim 21, wherein the I/O bus electrically connect a chipset, another first processor socket, an I/O controller or a subsystem.

* * * * *